US012600297B2

(12) United States Patent
Haraguchi

(10) Patent No.: US 12,600,297 B2
(45) Date of Patent: Apr. 14, 2026

(54) VEHICLE SUN VISOR

(71) Applicant: KYOWA SANGYO CORP., Toyota (JP)

(72) Inventor: Takashi Haraguchi, Toyota (JP)

(73) Assignee: KYOWA SANGYO CORP., Toyota (JP)

( * ) Notice: Subject to any disclaimer, the term of this patent is extended or adjusted under 35 U.S.C. 154(b) by 357 days.

(21) Appl. No.: 18/036,484

(22) PCT Filed: Dec. 1, 2021

(86) PCT No.: PCT/JP2021/044127
§ 371 (c)(1),
(2) Date: May 11, 2023

(87) PCT Pub. No.: WO2022/118893
PCT Pub. Date: Jun. 9, 2022

(65) Prior Publication Data
US 2023/0398929 A1 Dec. 14, 2023

(30) Foreign Application Priority Data
Dec. 2, 2020 (JP) ................................. 2020-200331

(51) Int. Cl.
| *B60Q 3/64* | (2017.01) |
| *B60J 3/02* | (2006.01) |
| *B60Q 3/252* | (2017.01) |
| *B60Q 3/82* | (2017.01) |

(52) U.S. Cl.
CPC .............. *B60Q 3/64* (2017.02); *B60J 3/0217* (2013.01); *B60Q 3/252* (2017.02); *B60Q 3/82* (2017.02)

(58) Field of Classification Search
CPC . B60Q 3/64; B60Q 3/252; B60Q 3/72; B60Q 3/82; B60J 3/0282; B60J 3/0217; F21Y 2115/10; F21V 33/00
See application file for complete search history.

(56) References Cited

FOREIGN PATENT DOCUMENTS

| JP | H09-039634 A | 2/1997 |
| JP | H10-142008 A | 5/1998 |
| JP | 2004-150850 A | 5/2004 |
| JP | 3838187 B2 | 10/2006 |
| JP | 2011-183958 A | 9/2011 |

OTHER PUBLICATIONS

Jul. 23, 2024 Office Action issued in Japanese Patent Application No. 2020-200331.

*Primary Examiner* — Paul N Dickson
(74) *Attorney, Agent, or Firm* — Oliff PLC

(57) ABSTRACT

A vehicle sun visor has a light source on a light guide plate back side allowing light to be emitted, a visor main body, and a light source inside the body. A light guide plate is installed on a light source front side. The plate has a first exit surface reflecting light inside the plate from a back surface. A second exit surface reflecting light passing along the plate is formed on its back surface. A mirror plate is installed alongside on the plate front side, and has a mirror region covering the light source and the first exit surface from the front side, and a luminous region covering the second exit surface from the front side. A diffusion member is placed in direct and close contact with a luminous region back surface, and the diffusion member diffuses light from the light guide plate toward the front side.

11 Claims, 7 Drawing Sheets

UP

FRONT ← → BACK

DOWN

VEHICLE SUN VISOR

TECHNICAL FIELD

The present invention relates to a vehicle sun visor including a mirror.

BACKGROUND ART

Patent Literature 1 discloses a lighting device applied to a combination meter of an automobile etc. This lighting device includes a light source and a light guide plate, and the light guide plate has a reflective surface at an end portion. The light source is disposed such that only half of its light on the light guide plate side from the optical axis reflects off the reflective surface. The light having reflected off the reflective surface travels through the inside of the light guide plate and is reflected as well as diffused by a grained surface in a bottom surface of the light guide plate.

Patent Literature 2 discloses a lighting device included in a mirror unit of a vehicle sun visor. This lighting device has an LED as a light source, and the LED is placed adjacent to a side edge of a light guide plate constituting a mirror. However, the light guide plate is thin and so it is not easy to place the LED adjacent to the side edge of the light guide plate. One can then think of employing the lighting device described in Patent Literature 1 on the back side of the light guide plate. This means installing a light guide plate for a lighting purpose on the back side of and alongside of a light guide plate serving as a mirror. The light guide plate for a lighting purpose reflects as well as diffuses light by the grained surface of the bottom surface. The diffused light enters the luminous region of the light guide plate serving as a mirror.

CITATION LIST

Patent Literature

[Patent Literature 1] Japanese Patent No. 3838187
[Patent Literature 2] Japanese Unexamined Patent Application Publication No. 2011-183958

SUMMARY OF THE INVENTION

However, there is a gap that is a layer of air between the light guide plate for a lighting purpose and the light guide plate serving as a mirror. Dust can get into this gap. This raises a concern that light may be blocked or deflected in an undesired direction by air or dust in the gap. Thus, there has been hitherto a need for a vehicle sun visor that has a light source disposed on the back side of a mirror plate (light guide plate) constituting a mirror and that includes a configuration that allows light from the light source to be emitted at an appropriate angle.

According to one feature of this disclosure, a vehicle sun visor including a mirror and a light source has a plate-shaped visor main body and a light source provided inside the visor main body. A light guide plate through which light from the light source can pass is installed on the front side of the light source. One of end surfaces of the light guide plate is a first exit surface that reflects, along the light guide plate, light that has entered inside the light guide plate from a back surface of the light guide plate. A second exit surface that reflects, toward the front side, light that passes along the light guide plate is formed on the back surface of the light guide plate. A mirror plate is installed on the front side of and alongside of the light guide plate. The mirror plate has a mirror region that covers the light source and the first exit surface of the light guide plate from the front side. A reflective film constituting a mirror is attached to a back surface of the mirror region of the mirror plate. The mirror plate has a luminous region that covers the second exit surface of the light guide plate from the front side. A diffusion member is placed in direct and close contact with a back surface of the luminous region of the mirror plate, and the diffusion member diffuses light from the light guide plate toward the front side.

Thus, the light guide plate and the mirror plate are placed one on top of the other in the thickness direction. A mirror and a light emitting structure in a relatively thin structure is thereby formed. The diffusion member is placed in direct and close contact with the back surface of the mirror plate. Therefore, no gap is formed between the diffusion member and the mirror plate. Accordingly, it is unlikely that light having passed through the diffusion member may be blocked or deflected by air in the gap or dust having gotten into the gap. Thus, light emitted from the luminous region of the mirror plate is diffused toward a user's side at an appropriate angle. The light source and the first exit surface of the light guide plate are covered by the reflective film. This prevents the light source and the first exit surface of the light guide plate from coming directly into the user's field of vision. Thus, the user is prevented from feeling dazzled.

According to another feature of this disclosure, the diffusion member is formed by depressions and protrusions formed in the back surface of the luminous region of the mirror plate. This means that the diffusion member is not a member that is separate from the mirror plate but is formed in the mirror plate itself. This can reduce the number of components of the vehicle sun visor. Moreover, since the diffusion member is formed in the mirror plate itself, no gap is formed between the mirror plate and the diffusion member.

According to another feature of this disclosure, the diffusion member has a smooth front surface that directly contacts the back surface of the mirror plate and a back surface that includes depressions and protrusions to diffuse light. Thus, when the smooth front surface of the diffusion member is brought into close contact with the back surface of the mirror plate, the area of the part where the mirror plate and the diffusion member contact each other becomes larger. Accordingly, the likelihood that a gap may form in a plane in which the mirror plate and the diffusion member contact each other can be more reliably reduced. Therefore, light emitted from the luminous region of the mirror plate is diffused toward the user's side at an appropriate angle. Moreover, the strength of the close contact between the mirror plate and the diffusion member can be increased.

According to another feature of this disclosure, a planar colored member containing a colorant is provided on a back surface of the diffusion member. Accordingly, light from the light guide plate is colored as it passes through the colored member. Thus, the color of the light emitted from the luminous region of the mirror plate can be arbitrarily set. The colored member is located on the upstream side of the diffusion member. Therefore, the colored member can have a relatively small shape. For example, when disposing the colored member on the downstream side of the diffusion member, it is necessary to enlarge the colored member with diffusion of light taken into account. Compared with this structure, the colored member can have a relatively small shape.

According to another feature of this disclosure, the vehicle sun visor has a second diffusion member that directly contacts a back surface of the diffusion member of the mirror plate. The second diffusion member has a smooth front surface that contacts the diffusion member and a back surface that includes depressions and protrusions to diffuse light. Accordingly, light from the light guide plate is diffused by the second diffusion member. The light having exited from the second diffusion member is further diffused by the diffusion member of the mirror plate. Thus, the light emitted from the luminous region of the mirror plate is diffused toward the user's side at a wider angle.

MODES FOR CARRYING OUT THE INVENTION

Figure 1:
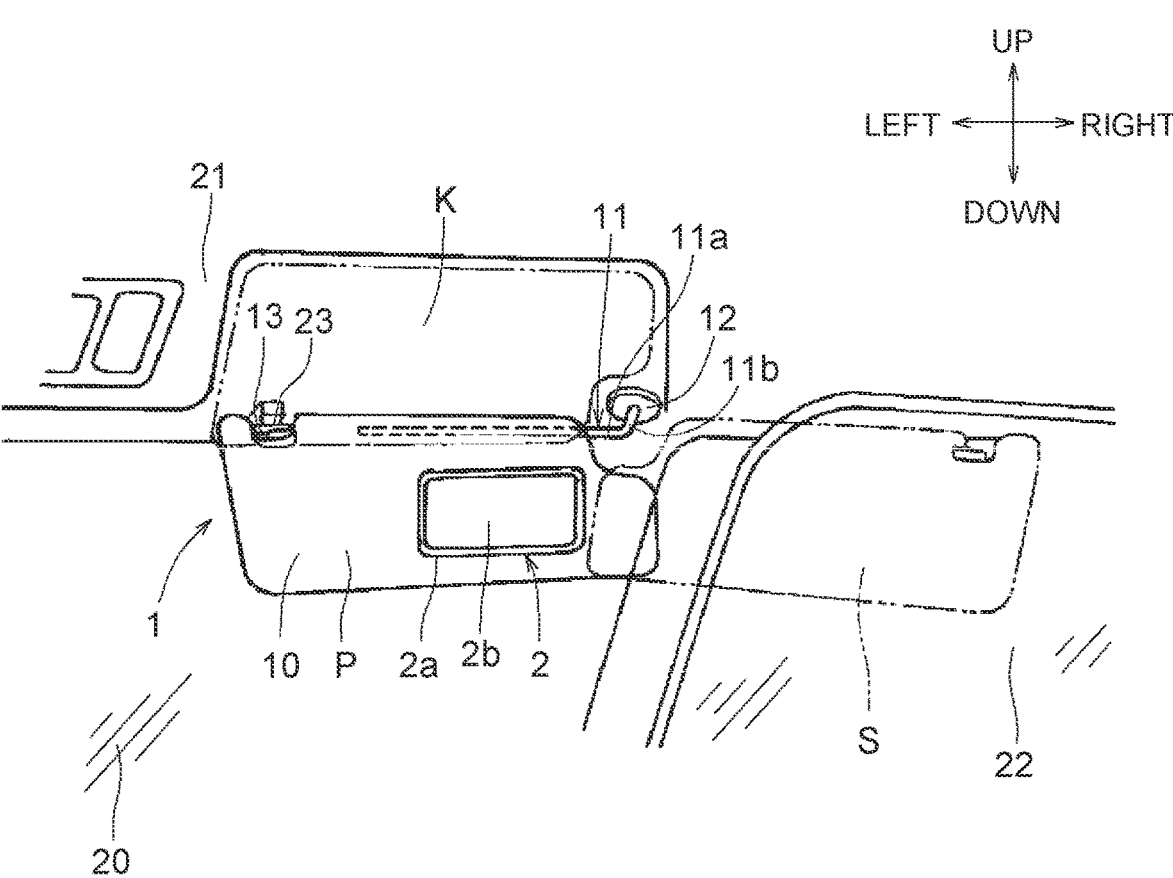
FIG. 1 is a perspective view of part of an inside of a vehicle and a sun visor mounted on a ceiling of the vehicle.

One embodiment of the present invention will be described using FIG. 1 to FIG. 8. As shown in FIG. 1, a vehicle sun visor 1 is attached to a ceiling surface 21 that is adjacent to an upper edge of a windshield 20 inside a vehicle cabin. The vehicle 25 sun visor 1 includes a plate-shaped visor main body 10 and a mirror unit 2 provided on one surface of the visor main body 10. The visor main body 10 includes flat plate-shaped first shell 10a and second shell 10b that are laid one on top of the other in a thickness direction. A skin 10c is placed over a front surface of the visor main body 10 (see FIG. 7).

As shown in FIG. 1, a pivot shaft 11 and a support shaft 13 are attached to the visor main body 10. The pivot shaft 11 is a substantially L-shaped rod and has a horizontal shaft 11a and a vertical shaft 11b. The horizontal shaft 11a has an elongated shaft shape and a linear shape, and is rotatably inserted at an upper edge of the visor main body 10. The vertical shaft 11b extends upward from a leading end of the horizontal shaft 11a, substantially orthogonally to the horizontal shaft 11a. A leading end of the vertical shaft 11b is rotatably attached to a bracket 12. The bracket 12 is mounted to the ceiling surface 21 of the vehicle cabin.

As shown in FIG. 1, the support shaft 13 has a substantially columnar shape and removably held by a hook 23 that is fixed on the ceiling surface 21. As the support shaft 13 is mounted to the hook 23, the visor main body 10 turns around the support shaft 13 and the horizontal shaft 11a as an axis, between a use position P along the windshield 20 and a retracted position K along the ceiling surface 21. As the support shaft 13 is removed from the hook 23, the visor main body 10 becomes turnable around the vertical shaft 11b. Thus, the visor main body 10 turns between the use position P along the windshield 20 and a side position S along a side window 22.

Figure 2:
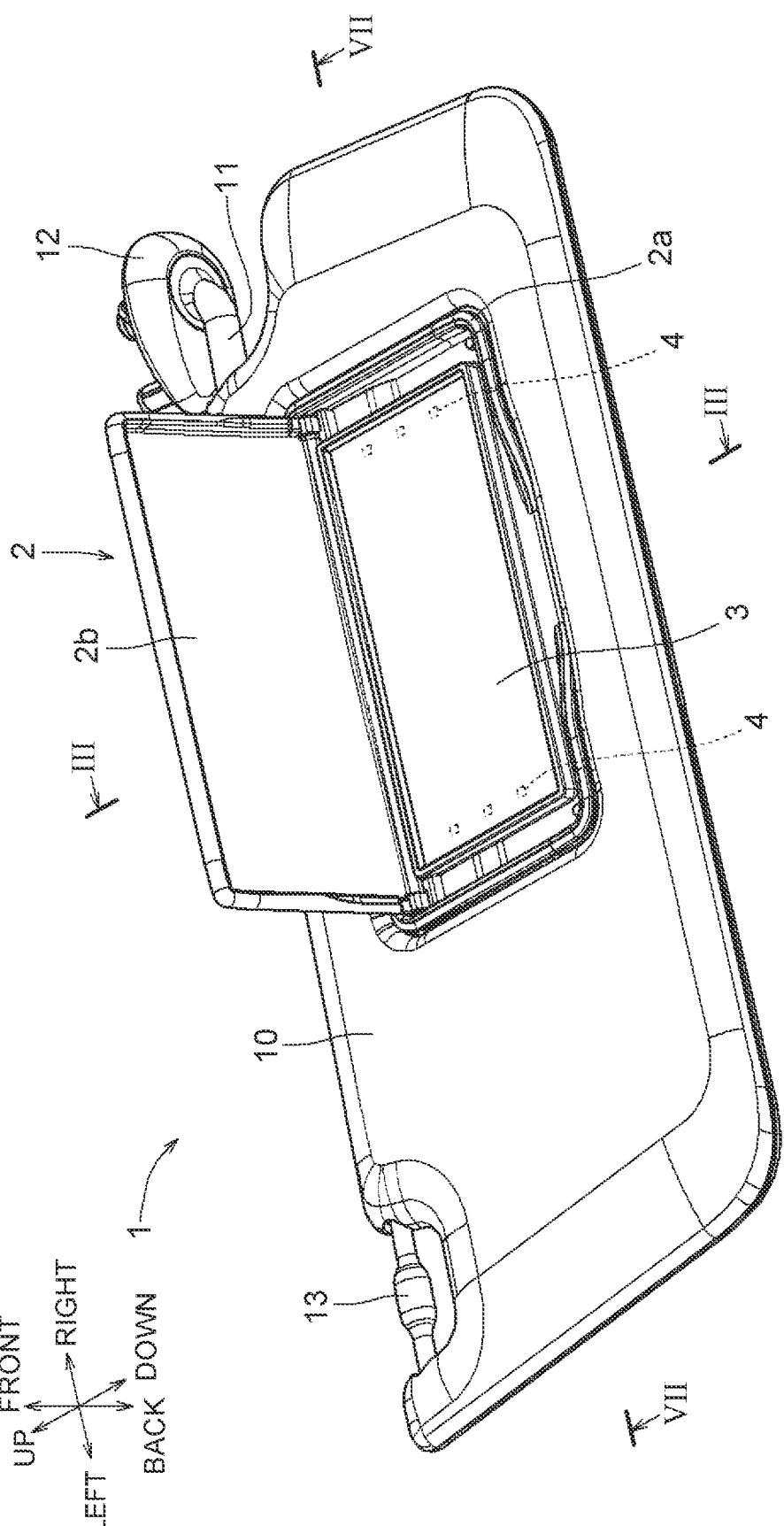
FIG. 2 is a perspective view of the sun visor in a state where a lid of a mirror unit is opened.
Figure 3:
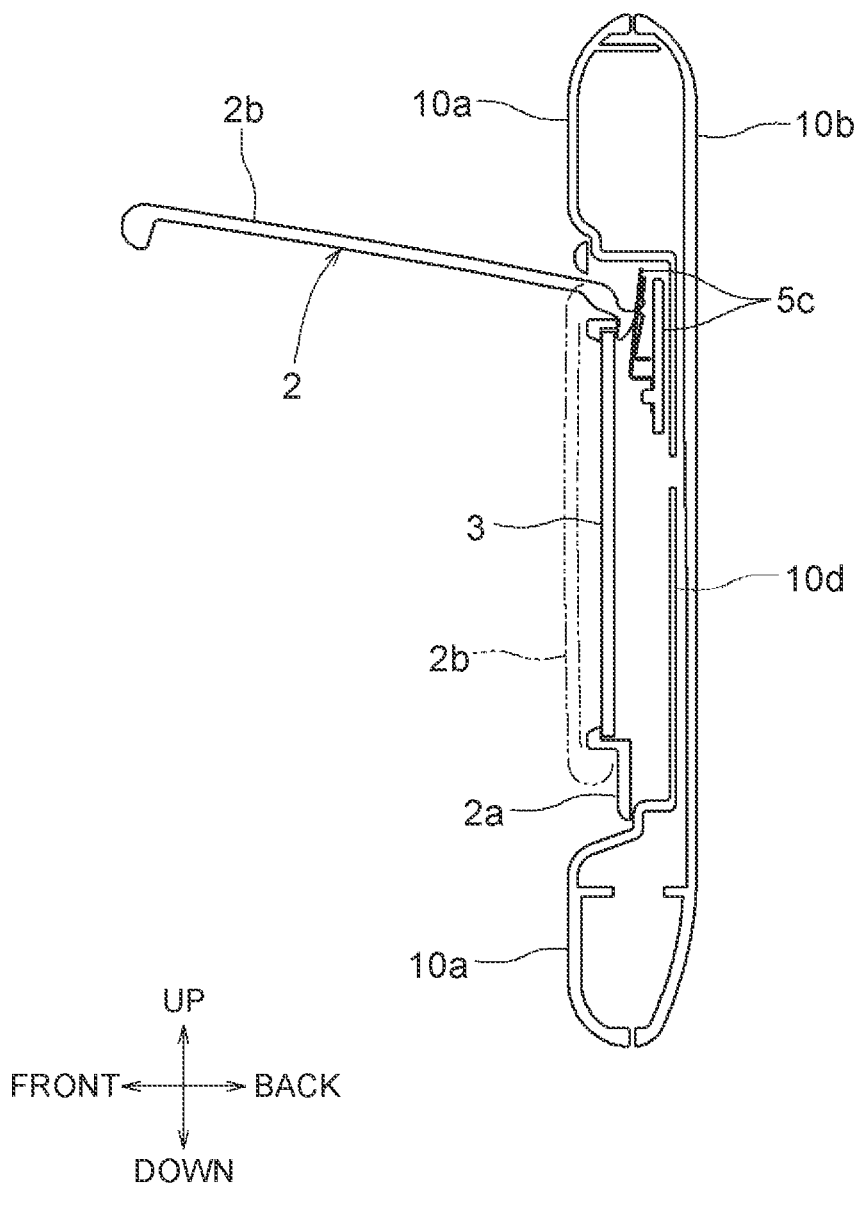
FIG. 3 is a view of section of FIG. 2 as seen in the arrow direction.

As shown in FIGS. 2 and 3, the mirror unit 2 has a lid 2b that can be opened and closed. In the following, description will be given with the directions of up and down, left and right, and front and back defined based on a state where the visor main body 10 is set in the use position P and seen from a user. On one surface (front surface) of the visor main body 10, a rectangular mirror housing part 10d is formed where the first shell 10a is recessed toward an inside of the visor main body 10 in the thickness direction. The mirror unit 2 is fitted in the mirror housing part 10d.

Figure 4:
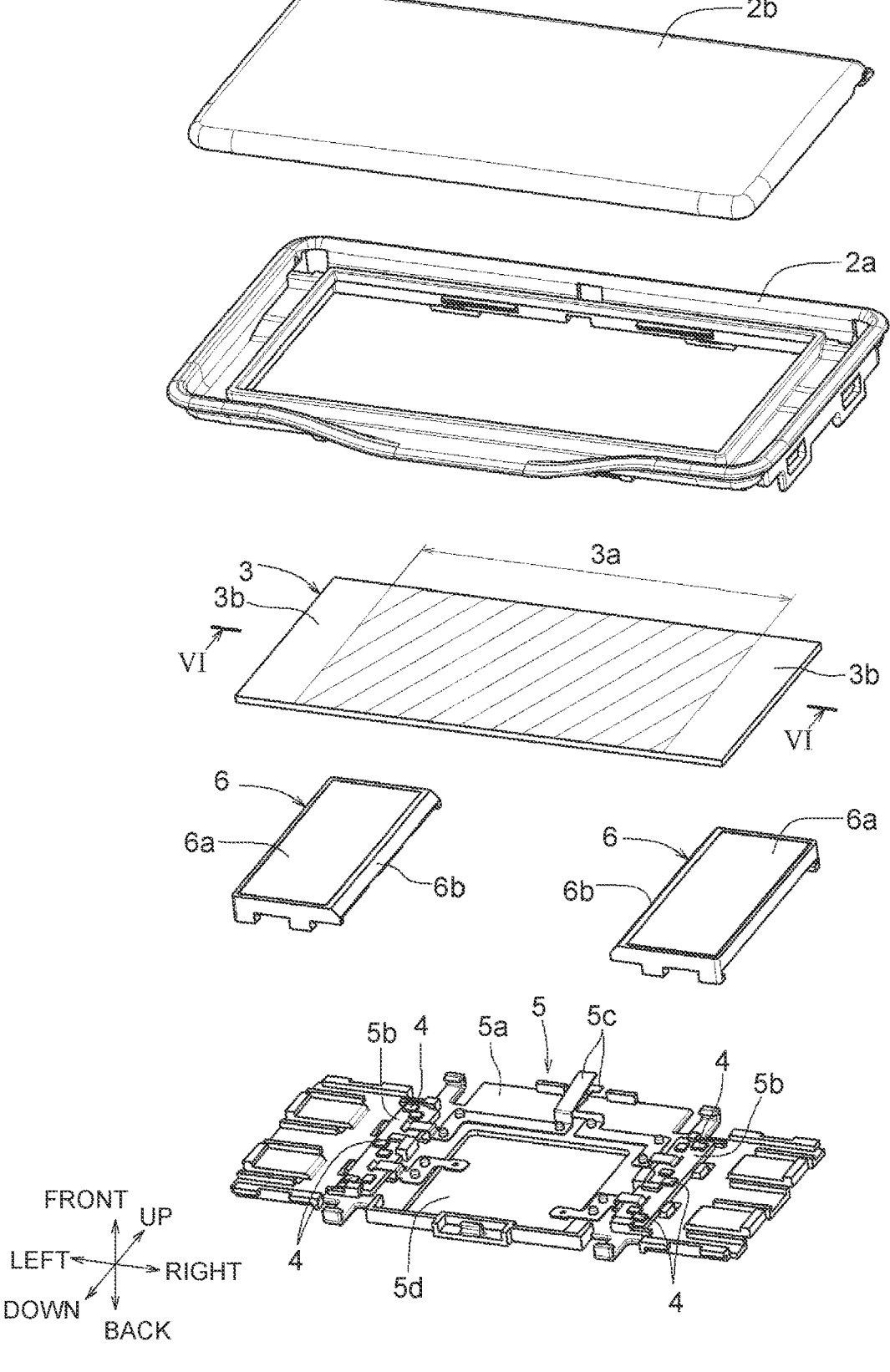
FIG. 4 is an exploded perspective view of the mirror unit.
Figure 5:
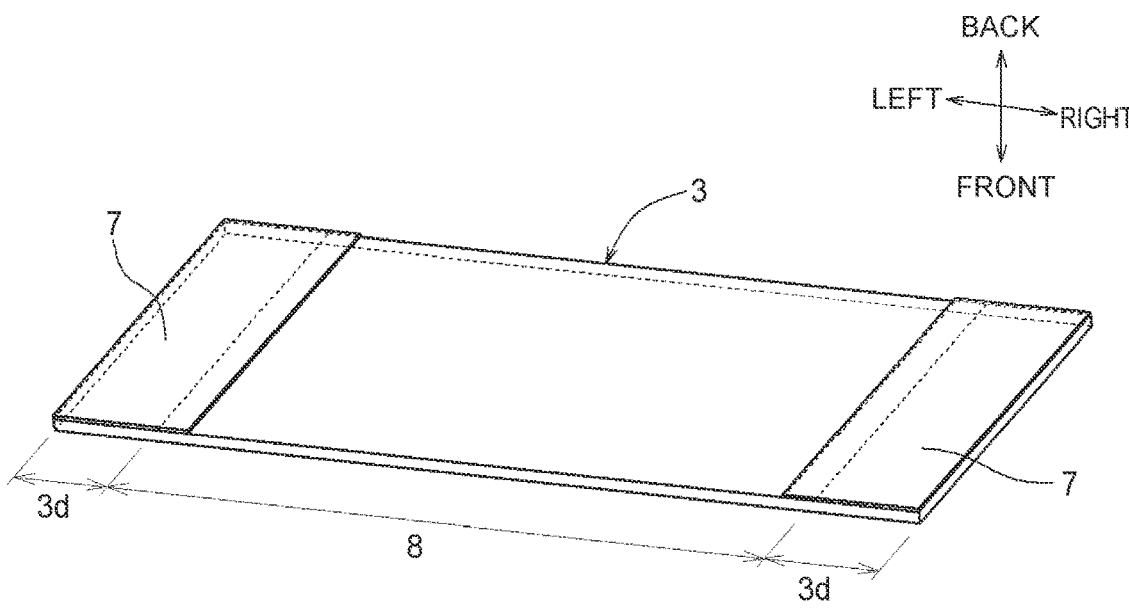
FIG. 5 is a perspective view of a back surface of a mirror plate.

As shown in FIG. 4, the mirror unit 2 has a rectangular mirror frame 2a. The lid 2b is attached to a front side of the mirror frame 2a such that the lid 2b can be opened and closed. On a back side of the mirror frame 2a, a mirror plate 3, reflectors 6, and a unit board 5 are attached in this order. Light sources 4 are provided on the unit board 5. Closing the lid 2b can cover the mirror plate 3. As shown in FIG. 5, a diffusion sheet 7 (diffusion member) is installed on a back surface of the mirror plate 3.

As shown in FIG. 4, the unit board 5 has a base 5a, and the base 5a has a cutout 5d formed at a center. Substrates 5b are installed on left and right sides of the base 5a. On each substrate 5b, a plurality of, for example, three light sources 4 are installed. As the light sources 4, for example, light-emitting diodes (LEDs) are used. On an upper side of the cutout 5d, a switch 5c for switching the power to the light sources 4 on and off is installed.

Figure 8:
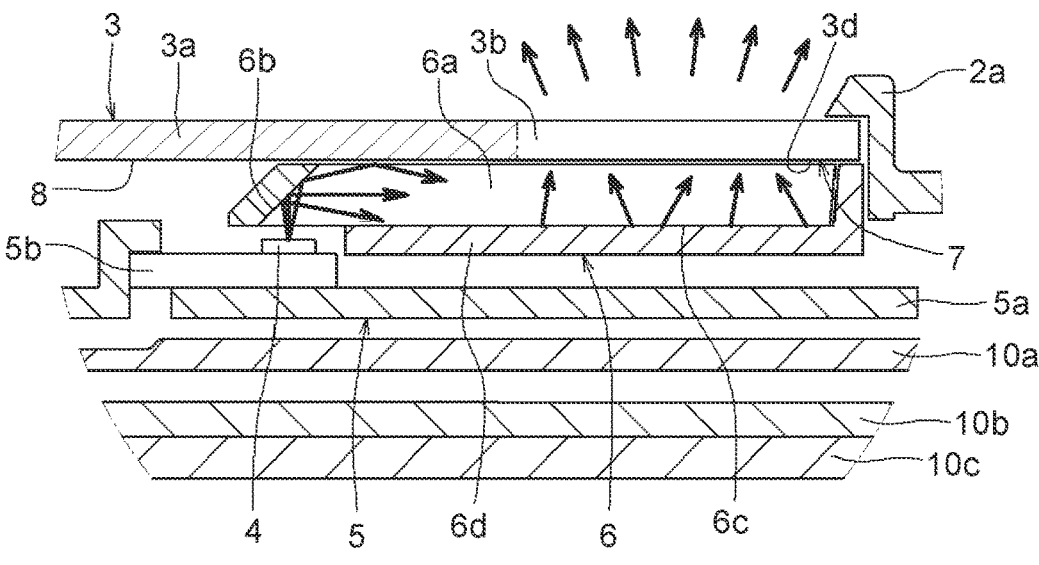
FIG. 8 is a partially enlarged view of part VIII of FIG. 7.

As shown in FIGS. 4 and 8, the reflectors 6 each including a light guide plate 6a are installed on the unit board 5. The reflectors 6 are disposed on left and right sides of the base 5a and cover the substrates 5b on which the light sources 4 are attached. The light guide plates 6a have a rectangular shape and cover the substrates 5b. Surfaces of each light guide plate 6a other than a front surface are surrounded by the reflector 6. The reflector 6 has a reflective plate 6d on a surface that contacts a back surface of the light guide plate 6a.

As shown in FIG. 4, a flat plate-shaped mirror plate 3 is installed on the front side of and alongside of the light guide plates 6a. The mirror plate 3 is mounted to the mirror frame 2a and covers the left and right reflectors 6. Thus, the left and right light guide plates 6a are covered by one mirror plate 3. An upper edge of the lid 2b is rotatably mounted to the mirror frame 2a. Thus, as the lid 2b rotates upward as shown in FIG. 3, the mirror plate 3 is exposed.

Figure 7:
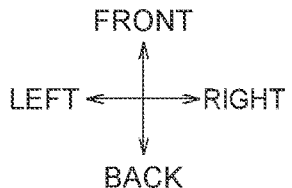
FIG. 7 is a view of section VII-VII of FIG. 2 as seen in the arrow direction.
Figure 7:
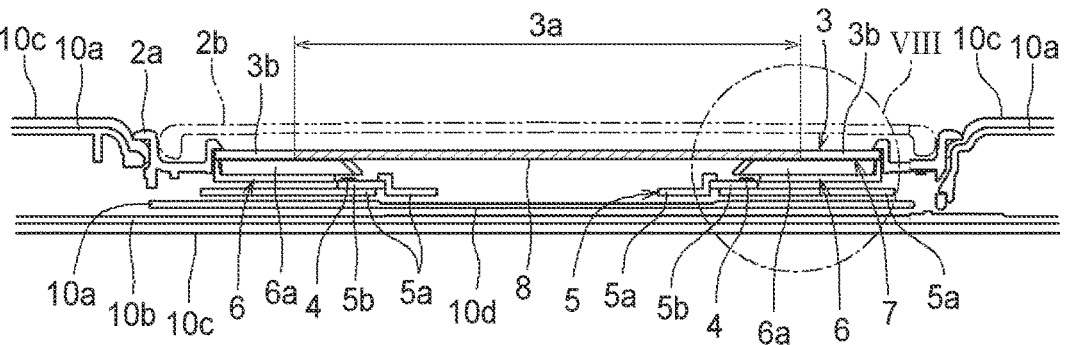

As the mirror plate 3, for example, a one-way mirror made of glass is used. As shown in FIG. 4, the mirror plate 3 has a mirror region 3a that serves as a mirror at a center in the left-right direction, and has luminous regions 3b that serve as lighting on left and right sides. As shown in FIGS. 7 and 8, the mirror region 3a covers the light sources 4 and first exit surfaces 6b of the light guide plates 6a from the front side. The luminous regions 3b cover second exit surfaces 6c of the light guide plates 6a from the front side. A silver film as a reflective film 8 constituting a mirror is attached to a back surface of the mirror region 3a.

As shown in FIG. 5, the reflective film 8 is attached from the back surface of the mirror plate 3. Specifically, the silver film is attached by printing to the back surface of the mirror plate 3, from a center toward left and right sides, except for end portions of the mirror plate 3 in the left-right direction. The part of the mirror plate 3 on which the silver film is attached forms a mirror surface and reflects light that has entered from the front side of the mirror plate 3. Thus, this part functions as the mirror region 3a.

Figure 6:
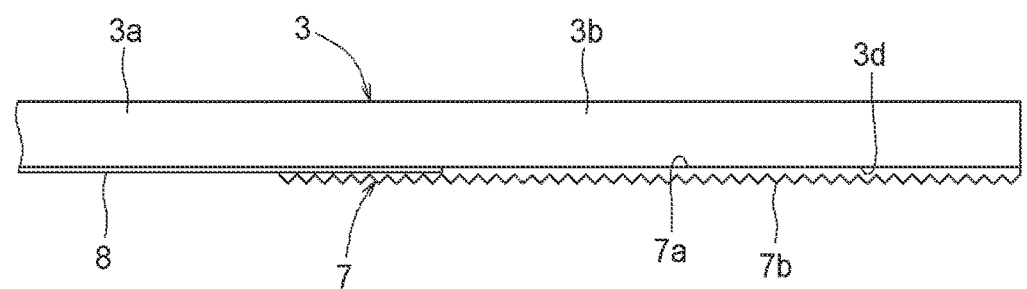
FIG. 6 is a view of section VI-VI of FIG. 4 as seen in the arrow direction.

As shown in FIGS. 5 and 6, the diffusion sheets 7 are placed in direct and close contact with back surfaces 3d of the luminous regions 3b in the mirror plate 3. For example, the diffusion sheets 7 are mounted to the mirror plate 3 by means of an adhesive agent or a double-sided adhesive tape. Each diffusion sheet 7 has a smooth surface 7a and a rugged surface 7b. As a front surface of the diffusion sheet 7, the smooth surface 7a directly contacts the back surface of the mirror plate 3. As a back surface of the diffusion sheet 7, the rugged surface 7b includes depressions and protrusions to diffuse light. The depressions and protrusions are provided alternately alongside each other in the left-right direction and extend in an up-down direction. The diffusion sheets 7 change the angle of light from the light guide plates 6a toward the front side and thereby diffuse the light toward the front side. As the back surfaces 3d of the luminous regions 3b and the smooth surfaces 7a of the diffusion sheets 7 are bonded together, the likelihood that a gap may form between the mirror plate 3 and the diffusion sheets 7 is reduced.

As shown in FIG. 8, each light guide plate 6a is formed by a material through which light from the light sources 4 can pass. For example, acrylic resin is used. Each light guide plate 6a has an end surface on a center side of the unit board 5, and the end surface has, in its back surface, the first exit surface 6b that is inclined from the center of the unit board 5 in the left-right direction toward the end portion. The first exit surface 6b is inclined so as to face the base 5a of the unit board 5. The first exit surface 6b is disposed so as to overlap rays of the light sources 4. The first exit surface 6b reflects, along the light guide plate 6a, light that has entered inside the light guide plate 6a from the back surface of the light guide plate 6a. A pattern is formed in the light guide plate 6a such that the light reflected by the first exit surface 6b exits from the front surface of the light guide plate 6a. The back surface of the light guide plate 6a is in contact with the reflective plate 6d of the reflector 6. The second exit surface 6c that reflects, toward the front side, light that passes along the light guide plate 6a is formed in the back surface of the light guide plate 6a.

As shown in FIG. 3, the mirror unit 2 is provided with a switch 5c that turns on when the lid 2b is opened and turns off when the lid 2b is closed. By turning on, the switch 5c electrically connects the substrate 5b and a power source of the vehicle to each other, and by turning off, electrically disconnects them. An electrical wire from the power source of the vehicle is coupled to the switch 5c and the substrates 5b by running from the ceiling surface 21 through the inside of the pivot shaft 11 and the inside of the visor main body 10. Thus, electricity is supplied to the light sources 4 and the light sources 4 emit light.

As shown in FIG. 8, the light emitted by the light sources 4 enters the light guide plate 6a from the back surface of the light guide plate 6a and reflects off the first exit surface 6b. The light reflected by the first exit surface 6b travels along the light guide plate 6a while reflecting or directly through the inside of the light guide plate 6a. Since the light sources 4 are disposed apart from the luminous region 3b, the light emitted by the light sources 4 and the light reflected by the first exit surface 6b can be prevented from coming directly into the user's field of vision. The light inside the light guide plate 6a is reflected by the second exit surface 6c on the back side of the luminous region 3b. The light reflected by the second exit surface 6c enters the luminous region 3b of the mirror plate 3 through the diffusion sheet 7.

Referring to FIG. 6, the light passing through the diffusion sheet 7 is diffused by the rugged surface 7b. Specifically, the light reflected by the second exit surface 6c of the light guide plate 6a is refracted and reflected by the depressions and protrusions of the rugged surface 7b so as to be evenly diffused in many directions. Thus, as seen from the user's side, the pattern of the light reflected by the second exit surface 6c is hidden and the light is emitted with even brightness.

Referring to FIGS. 6 and 8, the light diffused by the rugged surface 7b enters the luminous region 3b from the back surface of the mirror plate 3 through the smooth surface 7a. The smooth surface 7a and the back surface of the mirror plate 3 are in close contact with each other with no air layer or almost no air layer formed therebetween, so that the diffused light exits from the front surface of the luminous region 3b at an appropriate angle without being deflected. Thus, the luminous region 3b fulfills the function of a lighting device.

As has been described above, the vehicle sun visor 1 has the plate-shaped visor main body 10 and the light sources 4 provided inside the visor main body 10 as shown in FIG. 2. As shown in FIGS. 4 and 8, in the mirror unit 2, the light guide plates 6a through which light from the light sources 4 can pass are installed on the front side of the light sources 4. One of the end surfaces of each light guide plate 6a is the first exit surface 6b that reflects, along the light guide plate 6a, light that has entered inside the light guide plate 6a from the back surface of the light guide plate 6a. On the back surface of the light guide plate 6a, the second exit surface 6c that reflects, toward the front side, light that passes along the light guide plate 6a is formed (see FIG. 8). The mirror plate 3 is installed on the front side of and alongside of the light guide plates 6a. The mirror plate 3 has the mirror region 3a that covers the light sources 4 and the first exit surfaces 6b of the light guide plates 6a from the front side. The reflective film 8 that constitutes a mirror is attached to the back surface of the mirror region 3a of the mirror plate 3. The mirror plate 3 has the luminous regions 3b that cover the second exit surfaces of the light guide plate 6a from the front side. The diffusion members (e.g., the diffusion sheets 7) are placed in direct and close contact with the back surfaces 3d of the luminous regions 3b of the mirror plate 3, and the diffusion members (diffusion sheets 7) diffuse light from the light guide plates 6a toward the front side.

Thus, the light guide plates 6a and the mirror plate 3 are placed one on top of the other in the thickness direction. A mirror and a light emitting structure in a relatively thin structure is thereby formed. The diffusion members (diffusion sheets 7) are placed in direct and close contact with the back surface of the mirror plate 3. Therefore, no gap is formed between the diffusion members (diffusion sheets 7) and the mirror plate 3. Accordingly, it is unlikely that light having passed through the diffusion members (diffusion sheets 7) is blocked or deflected by air in the gap or dust having gotten into the gap. Thus, light emitted from the luminous regions 3b of the mirror plate 3 is diffused toward the user's side at an appropriate angle. The light sources 4 and the first exit surfaces 6b of the light guide plates 6a are covered by the reflective film 8. This prevents the light sources 4 and the first exit surfaces 6b of the light guide plates 6a from coming directly into the user's field of vision. Thus, the user is prevented from feeling dazzled.

As shown in FIG. 6, each diffusion member (e.g., diffusion sheet 7) has the smooth front surface (e.g., the smooth surface 7a) that directly contacts the back surface of the mirror plate 3 and the back surface (e.g., the rugged surface 7b) that includes depressions and protrusions to diffuse light. Thus, when the smooth front surface (smooth surface 7a) of the diffusion member (diffusion sheet 7) is brought into close contact with the back surface of the mirror plate 3, the area of the part where the mirror plate 3 and the diffusion member (diffusion sheet 7) contact each other becomes larger. Accordingly, the likelihood that a gap may form in a plane in which the mirror plate 3 and the diffusion member (diffusion sheet 7) contact each other can be more reliably reduced. Therefore, light emitted from the luminous region 3b of the mirror plate 3 is diffused toward the user's side at an appropriate angle. Moreover, the strength of the close contact between the mirror plate 3 and the diffusion member (diffusion sheet 7) can be increased.

As shown in FIG. 6, the diffusion member (e.g., the diffusion sheet 7) is placed in direct and close contact with the back surface of the mirror plate 3 by bonding. Accordingly, the mirror plate 3 and the diffusion member (diffusion sheet 7) are in a state of close contact in the plane in which they contact each other. Thus, a configuration is created in which the diffusion member (diffusion sheet 7) is less likely to come off the mirror plate 3.

As shown in FIGS. 7 and 8, each first exit surface 6b is formed as the end surfaces of the reflector 6 and the light guide plate 6a on the center side of the unit board 5 are inclined at the same angle (see FIG. 8). Moreover, each first exit surface 6b is disposed so as to overlap rays of the light sources 4. Thus, light emitted from the light sources 4 is allowed to enter inside the light guide plate 6a while the light sources 4 are hidden from the user's field of vision.

As shown in FIG. 7, in the mirror unit 2, the mirror plate 3 and the substrates 5b are installed such that their respective planes are parallel to each other. This configuration allows the arrangement of the mirror plate 3 and the substrates 5b to be set without depending on the thickness of the visor main body 10. Moreover, large areas of the mounting surfaces of the substrates become available. Therefore, other electronic components than the light sources 4 can also be mounted on one substrate, and the number of components and the assembly man-hours can be reduced to achieve a cost reduction.

This disclosure is not limited to the external appearance and the configuration having been described in the above embodiment, and various changes, additions, and omissions can be made within such a range that the gist is not changed.

Figure 11:
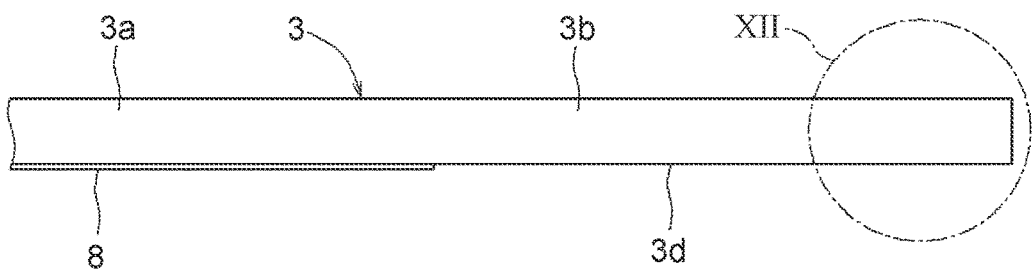
FIG. 11 is a sectional view, corresponding to FIG. 6, of a mirror plate in another embodiment.
Figure 12:
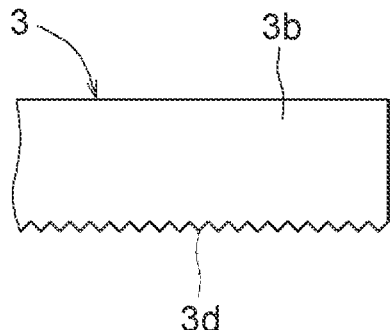
FIG. 12 is a partially enlarged view of part XII of FIG. 11.

For example, as shown in FIGS. 11 and 12, the diffusion members may be formed by depressions and protrusions formed in the luminous region back surfaces 3d of the mirror plate 3. Specifically, the depressions and protrusions are formed as the reflective film is mechanically cut at the end portions of the mirror plate 3 in the left-right direction (see FIG. 12). The depressions and protrusions are formed by, for example, laser processing, in a stripe pattern, a lattice shape, a grained shape, etc. Dents may be formed at some portions by shot peening. Thus, the diffusion members (the depressions and protrusions in the luminous region back surfaces 3d) are not members that are separate from the mirror plate 3 but are formed in the mirror plate 3 itself. This can reduce the number of components of the vehicle sun visor 1. Moreover, since the diffusion members (the depressions and protrusions in the luminous region back surfaces 3d) are formed in the mirror plate 3 itself, no gap is formed between the mirror plate 3 and the diffusion members (the depressions and protrusions in the luminous region back surfaces 3d).

The mirror plate 3 shown in FIG. 11 may have a configuration in which second diffusion members (e.g., diffusion sheets 7) that directly contact the back surfaces of the diffusion members (the depressions and protrusions in the luminous region back surfaces 3d) are provided. A front surface and a back surface of each second diffusion member (diffusion sheet 7) are both smooth surfaces. On the back surfaces of the second diffusion members (diffusion sheets 7), a planar colored member (e.g., an opaque white material) containing a colorant is provided by printing. Accordingly, light from the light guide plates 6a is colored as it passes through the colored members. Thus, the color of light emitted from the luminous regions 3b of the mirror plate 3 can be arbitrarily set. The colored members are located on an upstream side of the second diffusion members (diffusion sheets 7). Therefore, the colored members can have a relatively small shape. For example, when disposing the colored members on a downstream side of the second diffusion members (diffusion sheets 7), it is necessary to enlarge the colored members with diffusion of light taken into account. Compared with this structure, the colored members can have a relatively small shape. The colored members may be attached in a sheet form instead of being printed.

As shown in FIG. 6, each second diffusion member (diffusion sheet 7) may have a configuration in which it has a smooth front surface 7a that contacts the diffusion member (diffusion sheet 7) and a back surface 7b that includes depressions and protrusions to diffuse light. Light from the light guide plates 6a is diffused by the second diffusion members (diffusion sheets 7). Light having exited from the second diffusion members (diffusion sheets 7) is further diffused by the depressions and protrusions formed in the luminous region back surfaces 3d. Thus, light emitted from the luminous regions 3b of the mirror plate 3 is diffused toward the user's side at a wider angle.

The mirror plate 3 shown in FIG. 11 has the depressions and protrusions in the luminous region back surfaces 3d functioning as diffusion members. When the back surface of the mirror plate 3 is thus mechanically processed, a configuration in which the second diffusion members (diffusion sheets 7) are not attached to the luminous region back surfaces 3d may be adopted. Another configuration may be adopted in which a planar colored member (e.g., an opaque white or orange material) containing a colorant is printed on the depressions and protrusions of each luminous region back surface 3d. In addition, a configuration in which the colored member is attached in a sheet form may be adopted.

Figure 9:
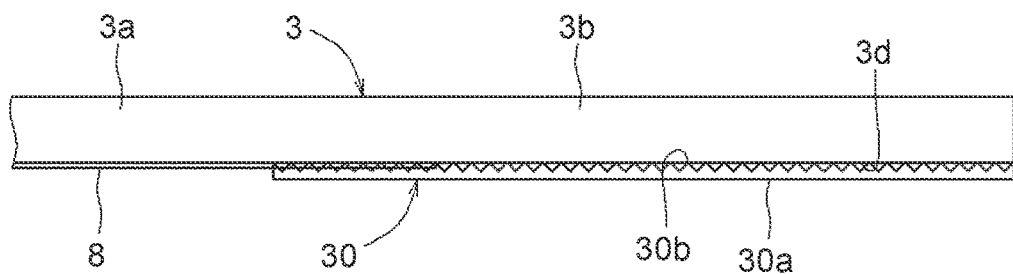
FIG. 9 is a sectional view, corresponding to FIG. 6, of a mirror plate and a diffusion member in another embodiment.

A planar colored member (e.g., an opaque white or orange material) containing a colorant may be provided on the back surface of each of the diffusion sheets 7, 30 shown in FIGS. 6 and 9. Light from the light guide plates 6a is colored as it passes through the colored members. Thus, the color of light emitted from the luminous regions 3b of the mirror plate 3 can be arbitrarily set. The colored members are located on the upstream side of the diffusion sheets 7, 30. Therefore, the colored members can have a relatively small shape. For attaching the colored members, formation by printing, bonding in a sheet form, etc. can be selected as appropriate.

Figure 10:
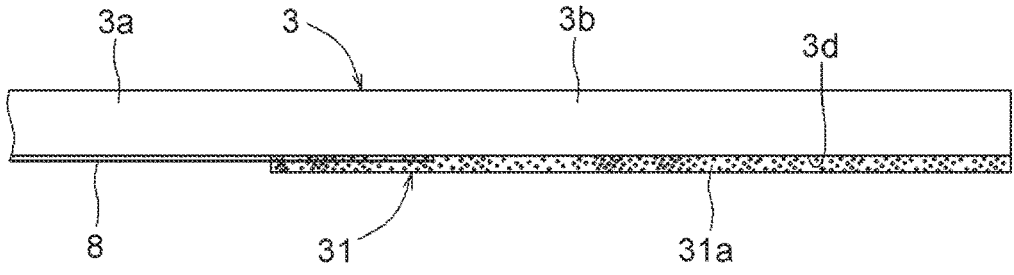
FIG. 10 is a sectional view, corresponding to FIG. 6, of a mirror plate and a diffusion member in another embodiment.

The diffusion sheet 7 shown in FIG. 6 has the smooth surface 7a attached to the mirror plate 3 and the rugged surface 7b facing a direction opposite from the mirror plate 3. Instead of this, the diffusion sheet 30 shown in FIG. 9 may be provided. The diffusion sheet 30 has a rugged surface 30b bonded to the back surface 3d of the luminous region 3b of the mirror plate 3. A smooth surface 30a faces the direction opposite from the mirror plate 3. Instead of this, a diffusion sheet 31 shown in FIG. 10 may be provided. The diffusion sheet 31 is formed by a material 31*a* containing substance that reflects light, such as glass beads.

The diffusion sheet 7 shown in FIG. 6 is attached to the mirror plate 3 by using an adhesive agent or an adhesive tape. Instead of this, the diffusion member may be printed on the mirror plate 3 by an ink jet method or a screen printing method. Thus, a configuration is created in which the diffusion member is less likely to come off the mirror plate 3. The diffusion member may be independent and has a sheet form or may be thinly printed on the back surface of the mirror plate 3.

The mirror shown in FIG. 3 has the mirror plate 3 that is a one-way mirror and formed by a light-transmissive material, and the reflective film 8 that reflects light (FIG. 5). Instead of this, a normal mirror may be provided in the mirror region 3*a*. The mirror plate 3 shown in FIG. 3 may be made of glass or may be made of a material through which light can pass, such as acrylic resin. The reflective film 8 shown in FIG. 5 is a silver film printed on the mirror plate 3. Instead of the silver film, aluminum may be attached to the mirror plate 3 by vapor deposition or the like.

The visor main body 10 shown in FIG. 2 is configured to have two shells. Instead of this, the visor main body 10 may be formed in one sheet shape from expandable beads etc.

The light sources 4 shown in FIG. 4 are LEDs. Instead of this, other types of light sources may be used as the light sources 4. The number and the arrangement of the light sources 4 can be changed as necessary. The light guide plates 6*a* shown in FIG. 4 are made of acrylic resin. Instead of this, the light guide plates 6*a* may be made of other materials, such as polycarbonate or glass.

The first exit surface 6*b* shown in FIG. 8 has a configuration in which the flat surface is inclined so as to face the base 5*a*. The angle of this inclination is arbitrarily set. The first exit surface 6*b* has a flat surface shape with a straight cross-sectional shape. Instead of this, the first exit surface 6*b* may be formed in a curved surface shape, a bent shape, etc.

The light guide plate 6*a* shown in FIG. 8 has the second exit surface 6*c* formed on the back surface. For the second exit surface 6*c*, various methods, for example, a method of printing a dot pattern or a method of cutting a groove are selectable.

REFERENCE SIGNS LIST

1 Vehicle sun visor
2 Mirror unit
2*a* Mirror frame
2*b* Lid
3 Mirror plate
3*a* Mirror region
3*b* Luminous region
3*d* Luminous region back surface
4 Light source
5 Unit board
5*a* Base
5*b* Substrate
5*c* Switch
6 Reflector
6*a* Light guide plate
6*b* First exit surface
6*c* Second exit surface
7 Diffusion sheet (diffusion member)
7*a* Smooth surface (front surface of diffusion member)
7*b* Rugged surface (back surface of diffusion member)
8 Reflective film

10 Visor main body

What is claimed is:

1. A vehicle sun visor comprising:
a plate-shaped visor main body;
a light source provided inside the visor main body;
a light guide plate, including a first exit surface and a second exit surface, installed on a front side of the light source and configured to pass light from the light source, the first exit surface being one of end surfaces of the light guide plate and being configured to reflect, along the light guide plate, light that has entered inside the light guide plate from a back surface of the light guide plate, and the second exit surface being provided on the back surface of the light guide plate so as to reflect, toward the front side, light that passes through the light guide plate;
a mirror plate installed on the front side of and alongside of the light guide plate, and including a mirror region and a luminous region, the mirror region being a region that covers the light source and the first exit surface of the light guide plate from the front side, and the luminous region being a region that covers the second exit surface of the light guide plate from the front side;
a reflective film constituting a mirror and attached to a back surface of the mirror region of the mirror plate; and
a diffusion member placed in direct and close contact with the back surface of the luminous region of the mirror plate and configured to diffuse light from the light guide plate toward the front side, wherein the diffusion member does not cover at least a portion of the reflective film in the mirror region.

2. The vehicle sun visor according to claim 1, wherein the diffusion member is configured by depressions and protrusions on the back surface of the luminous region of the mirror plate.

3. The vehicle sun visor according to claim 2, wherein a planar colored member containing a colorant is provided on a back surface of the diffusion member.

4. The vehicle sun visor according to claim 2, further comprising a second diffusion member that directly contacts a back surface of the diffusion member of the mirror plate, wherein the second diffusion member has a smooth front surface that contacts the diffusion member and a back surface that includes depressions and protrusions configured to diffuse light.

5. The vehicle sun visor according to claim 1, wherein the diffusion member has a smooth front surface that directly contacts the back surface of the mirror plate and a back surface that includes depressions and protrusions configured to diffuse light.

6. The vehicle sun visor according to claim 5, wherein a planar colored member containing a colorant is provided on a back surface of the diffusion member.

7. The vehicle sun visor according to claim 1, wherein the reflective film partially covers the mirror plate.

8. The vehicle sun visor according to claim 1, wherein a portion of the reflective film is disposed between the diffusion member and the mirror plate in the mirror region.

9. A vehicle sun visor comprising:
a plate-shaped visor main body;
a light source provided inside the visor main body;
a light guide plate, including a first exit surface and a second exit surface, installed on a front side of the light source and configured to pass light from the light source, the first exit surface being one of end surfaces of the light guide plate, disposed so as to overlap rays of the light source, and being configured to reflect, along the light guide plate, light that has entered inside the light guide plate from a back surface of the light guide plate, and the second exit surface being provided on the back surface of the light guide plate so as to reflect, toward the front side, light that passes through the light guide plate;

a mirror plate installed on the front side of and alongside of the light guide plate, and including a mirror region and a luminous region, the luminous region being a region that covers the second exit surface of the light guide plate from the front side; and a diffusion member placed in direct and close contact with the back surface of the luminous region of the mirror plate and configured to diffuse light from the light guide plate toward the front side, wherein the light source is disposed apart from the luminous region, and the diffusion member does not cover at least a portion of a reflective film in the mirror region.

10. The vehicle sun visor according to claim 9, wherein the reflective film partially covers the mirror plate.

11. The vehicle sun visor according to claim 9, wherein a portion of the reflective film is disposed between the diffusion member and the mirror plate in the mirror region.

* * * * *